US006459453B1

(12) United States Patent
Deming et al.

(10) Patent No.: US 6,459,453 B1
(45) Date of Patent: Oct. 1, 2002

(54) SYSTEM FOR DISPLAYING A TELEVISION SIGNAL ON A COMPUTER MONITOR

(75) Inventors: James Deming; Jeff S. Ford, both of Madison; Michael Potter, Huntsville, all of AL (US)

(73) Assignee: 3Dlabs Inc. Ltd., Hamilton (BM)

(*) Notice: Subject to any disclaimer, the term of this patent is extended or adjusted under 35 U.S.C. 154(b) by 0 days.

(21) Appl. No.: 09/353,419

(22) Filed: Jul. 15, 1999

Related U.S. Application Data

(60) Provisional application No. 60/093,182, filed on Jul. 17, 1998.

(51) Int. Cl.[7] .................................................. H04N 7/01

(52) U.S. Cl. ......................... 348/446; 348/595; 348/578

(58) Field of Search ................................ 348/578, 595, 348/446, 459, 441, 448, 447

(56) References Cited

U.S. PATENT DOCUMENTS

| | | | |
|---|---|---|---|
| 4,434,437 A | 2/1984 | Strolle et al. | 358/140 |
| 4,615,013 A | 9/1986 | Yan et al. | 364/521 |
| 4,646,232 A | 2/1987 | Chang et al. | 364/200 |
| 4,908,780 A | 3/1990 | Priem et al. | 364/521 |
| 4,918,626 A | 4/1990 | Watkins et al. | 364/522 |
| 4,991,122 A | 2/1991 | Sanders | 364/521 |
| 5,107,415 A | 4/1992 | Sato et al. | 395/800 |
| 5,123,085 A | 6/1992 | Wells et al. | 395/121 |

(List continued on next page.)

FOREIGN PATENT DOCUMENTS

| | | |
|---|---|---|
| EP | 0 311 798 A2 | 4/1989 |
| EP | 0 397 180 A2 | 11/1990 |
| EP | 0 438 194 A2 | 7/1991 |
| EP | 0 448 286 A2 | 9/1991 |
| EP | 0 463 700 A2 | 1/1992 |
| EP | 0 566 229 A2 | 10/1993 |
| EP | 0 627 682 A1 | 12/1994 |
| EP | 0 631 252 A2 | 12/1994 |
| EP | 0 693 737 A2 | 1/1996 |
| EP | 0 734 008 A1 | 9/1996 |
| EP | 0 735 463 A2 | 10/1996 |
| EP | 0 810 553 A2 | 12/1997 |
| EP | 0 817 009 A2 | 1/1998 |
| EP | 0 825 550 A2 | 2/1998 |
| EP | 0 840 279 A2 | 5/1998 |
| WO | WO 86/07646 | 12/1986 |
| WO | WO 92/00570 | 1/1992 |
| WO | WO 93/06553 | 4/1993 |
| WO | WO 97/21192 | 6/1997 |

OTHER PUBLICATIONS

"A Fine Grained Data Flow Machine and Its Concurrent Execution Mechanism," Iwashita et al., C&C Information Technology Research Labs, Apr. 1989, pp. 63–72.

"A Dataflow Image Processing System TIP–4," Fujita et al., C&C Information Technology Research Labs, NEC Corporation, Sep. 1989, pp. 735–741.

"Processing the New World of Interactive Media," Rathnam, The Trimedia VLIW CPU Architecture, Mar. 1998, pp. 108–117.

(List continued on next page.)

*Primary Examiner*—Victor R. Kostak
(74) *Attorney, Agent, or Firm*—Bockhop & Reich, LLP

(57) ABSTRACT

An apparatus and method for displaying a television signal on a computer monitor first receives a selected first field data block of the television signal for display by the monitor. The television signal preferably includes a stream of first field data blocks and second field data blocks that are intended for display by respective first and second sets of lines on the computer monitor. After receipt of the first field data block, an immediately preceding second field data block is faded to produce a faded second block. The faded second block then is displayed on the second set of lines of the monitor, and the first field data block is displayed on the first set of lines of the monitor.

42 Claims, 4 Drawing Sheets

U.S. PATENT DOCUMENTS

| | | | | |
|---|---|---|---|---|
| 5,239,654 A | | 8/1993 | Ing-Simmons et al. | 395/800 |
| 5,287,438 A | | 2/1994 | Kellecher | 395/132 |
| 5,293,480 A | | 3/1994 | Miller et al. | 395/163 |
| 5,313,551 A | | 5/1994 | Labrousse et al. | 395/425 |
| 5,359,712 A | * | 10/1994 | Cohen et al. | 395/161 |
| 5,363,475 A | | 11/1994 | Baker et al. | 395/122 |
| 5,371,840 A | | 12/1994 | Fischer et al. | 395/133 |
| 5,394,524 A | | 2/1995 | DiNicola et al. | 395/163 |
| 5,398,328 A | | 3/1995 | Weber et al. | 395/500 |
| 5,446,479 A | | 8/1995 | Thompson et al. | 345/139 |
| 5,485,559 A | | 1/1996 | Sakaibara et al. | 395/133 |
| 5,511,165 A | | 4/1996 | Brady et al. | 395/200.01 |
| 5,519,823 A | | 5/1996 | Barkans | 395/143 |
| 5,544,294 A | | 8/1996 | Cho et al. | 395/141 |
| 5,555,359 A | | 9/1996 | Choi et al. | 395/141 |
| 5,557,734 A | | 9/1996 | Wilson | 395/162 |
| 5,561,749 A | | 10/1996 | Schroeder | 395/120 |
| 5,572,713 A | | 11/1996 | Weber et al. | 395/500 |
| 5,631,693 A | | 5/1997 | Wunderlich et al. | 348/7 |
| 5,664,114 A | | 9/1997 | Krech, Jr. et al. | 395/200.64 |
| 5,666,520 A | | 9/1997 | Fujita et al. | 345/513 |
| 5,684,939 A | | 11/1997 | Foran et al. | 395/131 |
| 5,701,365 A | | 12/1997 | Harrington et al. | 382/212 |
| 5,706,481 A | | 1/1998 | Hannah et al. | 395/519 |
| 5,721,812 A | | 2/1998 | Mochizuki | 395/110 |
| 5,737,455 A | | 4/1998 | Harrington et al. | 382/284 |
| 5,757,375 A | | 5/1998 | Kawase | 345/429 |
| 5,757,385 A | | 5/1998 | Narayanaswami et al. | 345/505 |
| 5,764,237 A | | 6/1998 | Kaneko | 345/430 |
| 5,821,950 A | | 10/1998 | Rentschler et al. | 345/505 |
| 5,841,444 A | | 11/1998 | Mun et al. | 345/506 |
| 5,870,567 A | | 2/1999 | Hausauer et al. | 395/281 |
| 5,883,641 A | | 3/1999 | Krech, Jr. et al. | 345/505 |
| 5,914,711 A | | 6/1999 | Mangerson et al. | 345/203 |
| 5,926,647 A | * | 7/1999 | Adams et al. | 345/199 |
| 6,100,906 A | * | 8/2000 | Asaro et al. | 345/508 |
| 6,157,415 A | * | 12/2000 | Glen | 348/599 |

OTHER PUBLICATIONS

"Effective Cache Mechanism for Texture Mapping," IBM Technical Disclosure Bulletin, vol. 39, No. 12, Dec. 1996, pp. 213–217.

"Advanced Raster Graphics Architecture," XP–002118066, pp. 890–893.

"Data–Format Conversion: Intel/Non–Intel," vol. 33, No. 1A, Jun. 1990, IBM Technical Disclosure Bulletin, pp. 420–427.

"Address Munging Support in a Memory Controller/PCI Host Bridge for the PowerPC 603 CPU Operating in 32–Bit Data Mode," IBM Technical Disclosure Bulletin, vol. 38, No. 09, Sep. 1995, pp. 237–240.

"One Frame Ahead: Frame Buffer Management for Animation and Real–Time Graphics," XP–000749898, Auel et al., Tektronix Inc., pp. 43–50.

"Efficient Alias–Free Rendering Using a Bit–Masks and Look–Up Tables," Abram et al., The University of North Carolina at Chapel Hill, XP–002115680, Jul. 1985, pp. 53–59.

"A New Simple and Efficient Antialiasing with Subpixel Masks," Schilling et al., Computer Graphics, vol. 25, No. 4, Jul. 1991, pp. 133–141.

"A Multiprocessor System Utilizing Enhanced DSP's for Image Progressing," Ueda et al., XP 2028756, pp. 611–619.

"The Reyes Image Rendering Architecture," Cook et al., Computer Graphics, vol. 21, No. 4, Jul. 1987, pp. 95–102.

"The Accumulation Buffer: Hardware Support for High–Quality Rendering," Haeberli et al., Computer Graphics, vol. 24, No. 4, Aug. 1990, pp. 309–318.

"Advanced Animation and Rendering Techniques," Watt et al., ACM Press, New York, New York, pp. 127–137.

The A–Buffer, an Antialiased Hidden Surface Method, Carpenter,Loren,Computer Graphics, vol. 18, No. 3, Jul. 1984, pp. 13–18.

"One Frame Ahead: Frame Buffer Management for Animation and Real–Time Graphics," Computer Graphics, Proceedings of the Conference, vol. 89, Jan. 1, 1988, pp. 43–50, XP000749898, Kendall Avel.

* cited by examiner

SYSTEM FOR DISPLAYING A TELEVISION SIGNAL ON A COMPUTER MONITOR

PRIORITY

This application claims priority from provisional United States patent application identified as serial No. 60/093,182, filed Jul. 17, 1998, entitled "SYSTEM FOR DISPLAYING A TELEVISION SIGNAL ON A COMPUTER MONITOR", the disclosure of which is incorporated herein, in its entirety, by reference.

FIELD OF THE INVENTION

The invention generally relates to computer systems and, more particularly, the invention relates to displaying television signals on computer display devices.

BACKGROUND OF THE INVENTION

The National Television Standards Committee sets the standards for television signal transmission (the "NTSC standard") in the United States. In particular, the NTSC standard requires that a television signal include sixty interlaced half-frames for each second of a motion picture displayed by a television. To that end, a television signal in the United States includes a sequential series of alternating "odd" half-frames and "even" half-frames that are to be displayed on respective odd and even lines of a television display. Upon receipt of a television signal in which the first half frame is odd, for example, a television draws the entire first odd half-frame, followed by the entire first even half-frame, followed by the entire second odd half-frame, etc . . .

As is known in the art, a television includes a phosphor element on a display face of a cathode ray tube, and an electron gun for energizing the phosphor as specified by a received television signal. The energy emitted by the energized phosphor element produces a visible display of the television signal. The total time that elapses between the time that the phosphor is first energized, and the time that the energy in the phosphor dissipates (known as "phosphor persistence") is the entire time that a half-frame is viewable on a television display face. Typically, a half-frame is drawn while an immediately preceding half-frame is fading, but still visible. Together, the faded preceding half-frame and the half-frame being drawn produce a motion picture effect upon the display face of the cathode ray tube.

Unlike televisions, computer monitors draw entire frames instead of a series of half-frames. Specifically, a computer monitor is configured to consecutively draw each line on a monitor display face and thus, no lines on a computer monitor are skipped. Moreover, phosphor elements in a computer monitor typically have a much lower phosphor persistence than those in a television, thus enabling more frames to be displayed by a monitor each second. For example, many known types of computer monitors can draw sixty full frames each second while a television can only draw sixty half-frames each second. Accordingly, use of a television signal for display by a computer monitor typically does not produce the quality that a television signal produces on a television since half frames fade too rapidly on a computer monitor.

SUMMARY OF THE INVENTION

In accordance with one aspect of the invention, an apparatus and method for displaying a television signal on a computer monitor first receives a selected first field data block of the television signal for display by the monitor. The television signal preferably includes a stream of first field data blocks and second field data blocks that are intended for display by respective first and second sets of lines on the computer monitor. After receipt of the first field data block, an immediately preceding second field data block is faded to produce a faded second block. The faded second block then is displayed on the second set of lines of the monitor, and the first field data block is displayed on the first set of lines of the monitor.

In accordance with another aspect of the invention, the first field data block has an immediately following second field data block that is displayed on the second set of lines after the faded second block is displayed by such lines. The first field data block also may be faded to produce a faded first data block that is displayed on the first set of lines after the first field data block is displayed by such lines. The faded first data block preferably is displayed at the same time as the immediately following second field data block.

In preferred embodiments, the first field data blocks include even field line data and the second field blocks include odd field line data. The first set of lines thus are even lines and the second set of lines thus are odd lines. In other embodiments, the first field data blocks include odd field line data and the second field blocks include even field line data. The first set of lines thus are odd lines and the second set of lines thus are even lines.

In yet other embodiments of the invention, the television signal is in a NTSC (National Television Standards Committee) format or in a PAL (phase alternating line) format. In some embodiments, the immediately preceding data block is faded by first retrieving such data block from a front buffer in a double buffer frame buffer, and then applying alpha blending to such data block to produce the faded second block. Once produced, the faded block is copied into a back buffer of the frame buffer.

In accordance with another aspect of the invention, and apparatus and method of processing a television signal for simulating a television image on a computer monitor selectively fades data blocks. The television signal includes a stream of alternating first and second data blocks. More particularly, a first data block and second data block are received at an input. The first data block immediately precedes the second data block in the television signal. The first data block then is faded to produce a faded first data block. The faded first data block then is combined with the second data block to produce a frame. The frame then is forwarded to the computer monitor.

Alternative embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
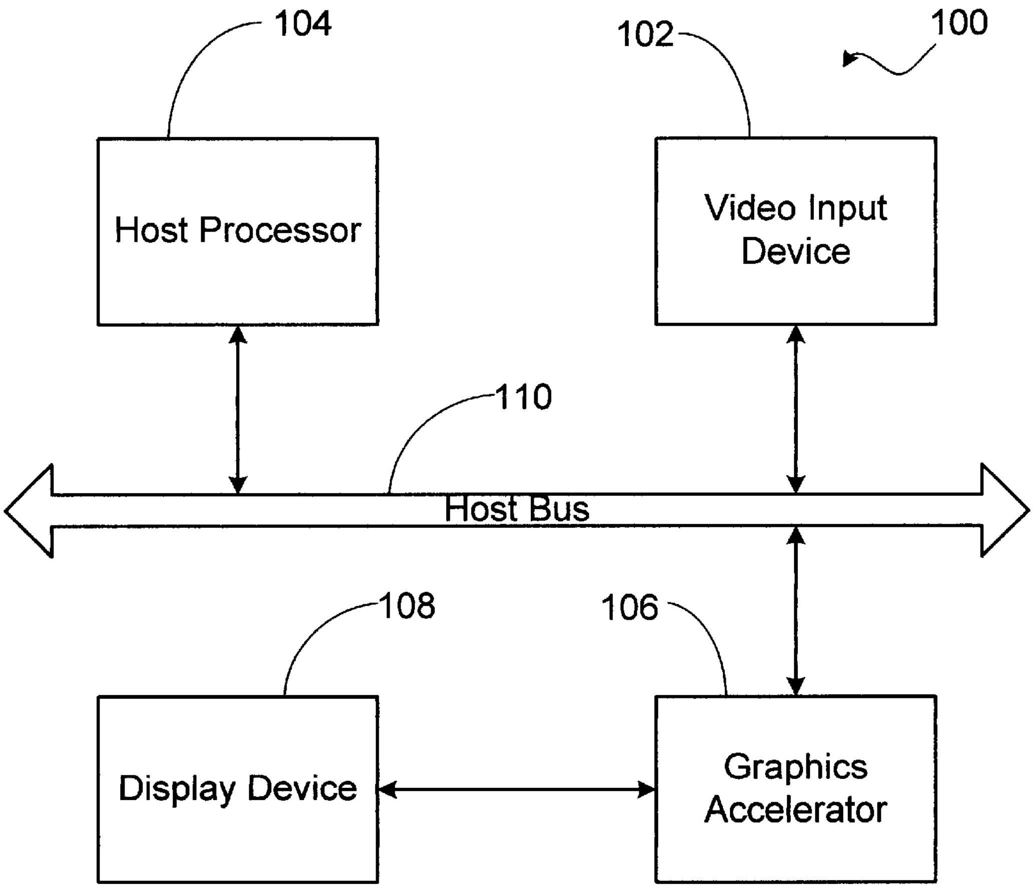
FIG. 1 schematically shows a portion of an exemplary computer system on which preferred embodiments of the invention may be implemented.

FIG. 1 shows a portion of an exemplary computer system 100 on which a preferred apparatus and method for displaying a television signal (i.e., a video signal) may be implemented. More particularly, the computer system 100 includes a video input device 102 for receiving a video signal, a host processor 104 (i.e., a central processing unit) for executing application level programs and system functions, a graphics accelerator 106 for processing the video signal in accord with preferred embodiments of the invention (see FIG. 3), and a bus coupling all of the other noted elements of the system 100. A display device 108 is coupled to the graphics accelerator 106 for displaying the video signal. The graphics accelerator 106 preferably utilizes any well known graphics processing application program interface such as, for example, the OPENGL™ application program interface (available from Silicon Graphics, Inc. of Mountain View, Calif.) to display the video signal and other graphical items.

The video signal may be any known video format such as, for example, those defined by the National Television Standards Committee ("NTSC format"), or the Phase Alternating Line format ("PAL format"). Of course, preferred embodiments are not limited by those formats and may be applied to other interlaced video formats. As known by those skilled in the art, such video signals typically include a data stream having a sequential series of alternating data blocks. Specifically, every other data block is an identical type of data block. For example, the data blocks in the data stream may include alternating odd line frame data and even line frame data. Accordingly, each even line data block has an immediately preceding and immediately succeeding odd line frame data block. In a similar manner, each odd line data block has an immediately preceding and immediately succeeding even line frame data block. A given data block described herein is considered to be immediately preceding or succeeding another given data block when no other data blocks are between such given data blocks.

Figure 2:
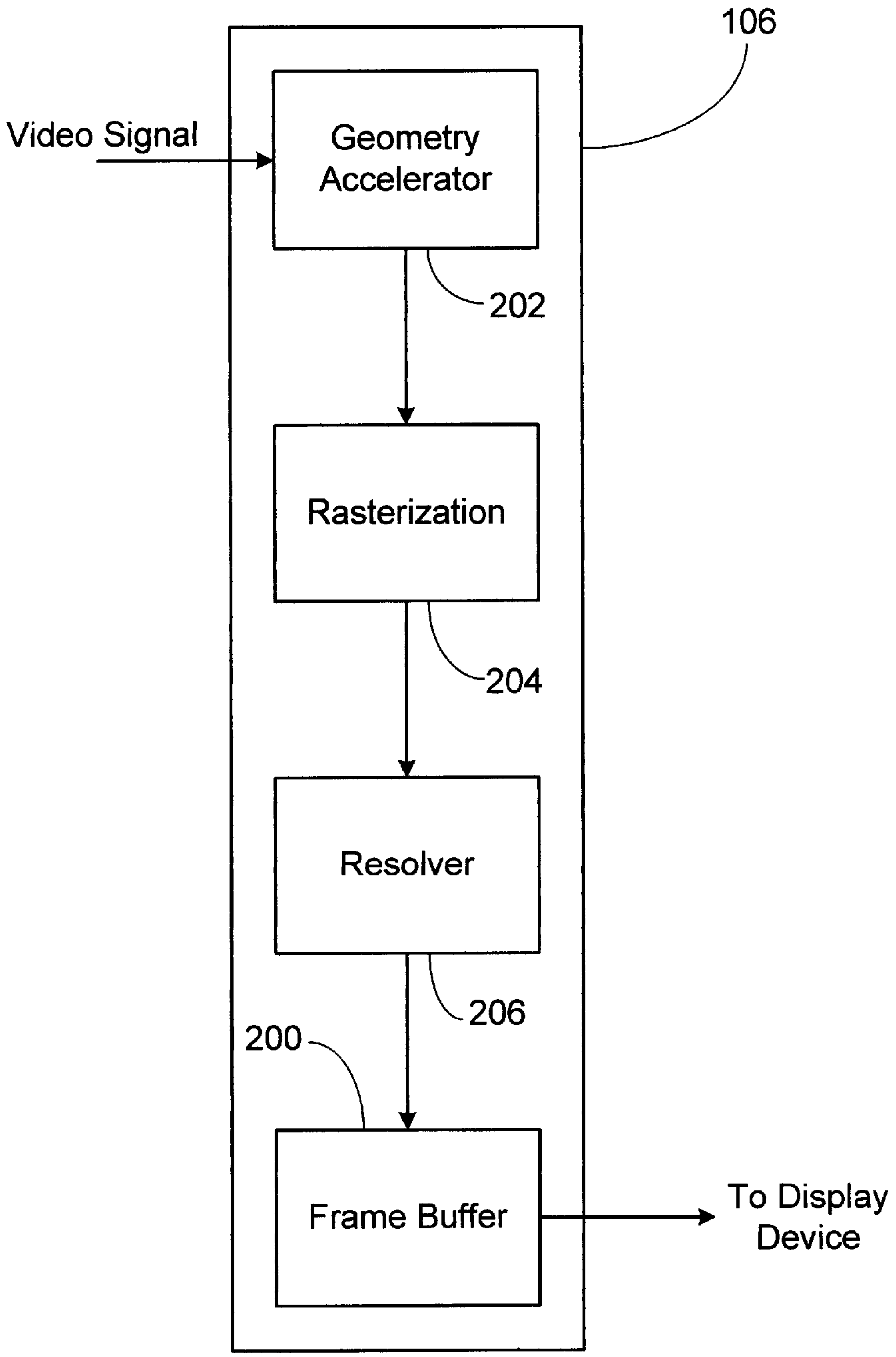
FIG. 2 shows a preferred graphics accelerator that may be utilized in accord with preferred embodiments of the invention.

FIG. 2 shows several elements of the graphics accelerator 106 shown in FIG. 1. In preferred embodiments, the graphics accelerator 106 includes a double buffered frame buffer 200 (i.e., having a back buffer 200A and a front buffer 200B, FIG. 4) for displaying the video signal in accord with the OPENGL™ interface. Among other things, the graphics accelerator 106 also preferably includes a geometry accelerator 202 for performing geometry operations that commonly are executed in graphics processing, a rasterizer 204 for rasterizing pixels on the display device 108, and a resolver 206 for storing data in the frame buffer 200 and transmitting data from the frame buffer 200 to the display device 108. The graphics accelerator 106 preferably is adapted to process both two dimensional and three dimensional graphical data.

In preferred embodiments, graphics processing is executed by a plurality of processors (e.g., rasterizers, geometry accelerators, etc . . . ) that together comprise the graphics accelerator 106. For additional information relating to preferred embodiments of the graphics accelerator 106, see, for example, copending patent application entitled "MULTI-PROCESSOR GRAPHICS ACCELERATOR", filed on even date herewith and naming Steven J. Heinrich, Stewart G. Carlton, Mark A. Mosley, Matthew E. Buckelew, Clifford A. Whitmore, Dale L. Kirkland, and James L. Deming as inventors, the disclosure of which is incorporated herein, in its entirety, by reference. For additional information relating to preferred embodiments of the graphics accelerator 106, see, for example, "WIDE INSTRUCTION WORD GRAPHICS PROCESSOR," filed on even date herewith and naming Vernon Brethour, Dale Kirkland, William Lazenby, and Gary Shelton as inventors, the disclosure of which is incorporated herein, in its entirety, by reference.

Figure 3:
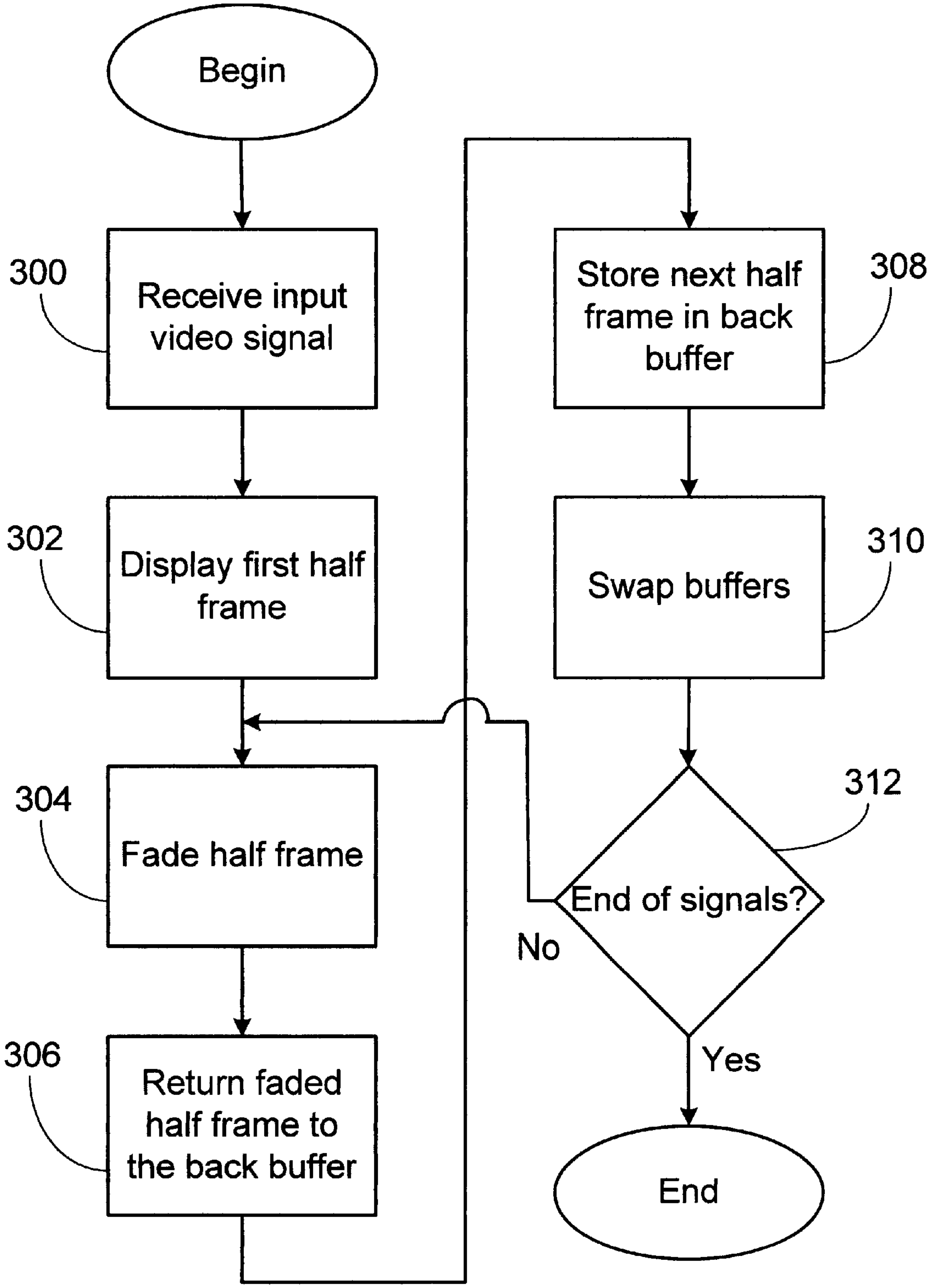
FIG. 3 shows a preferred process for displaying a television signal on a computer display device.

FIG. 3 shows a preferred process for displaying a television signal on the computer display device 108. The process is described in terms of a video signal having even and odd half-frames. As is known in the art, an even half-frame includes each of the even lines in a frame, while an odd half-frame includes each of the odd lines in a frame. The NTSC format, for example, defines a composite signal with a refresh rate of sixty half-frames per second (i.e., thirty odd half-frames and thirty even half-frames).

The process begins at step 300 in which the system 100 receives a input video signal having alternating odd and even half-frames. In accord with conventional processes, the first half-frame is processed by the graphics accelerator 106, stored in the back buffer 200A, and then swapped to the front buffer 200B for display on the display device 108 (step 302). The process continues to step 304 in which the half-frame in the front buffer 200B (i.e., the data representing such half-frame) is faded by means of conventional alpha fading processes.

To that end, the resolver 206 preferably includes a multipler (FIG. 4, discussed below) that fades a given half-frame by applying an alpha fading value, as defined by OPENGL™, to the given half-frame. This fading process produces a faded half-frame. In preferred embodiments, the faded half-frame is faded by a percentage that is comparable to the amount of fading that occurs between half-frames on a conventional television. More particularly, the approximate decay of a phosphor element in a television is modeled to determine the alpha value. To date, no experimental alpha values representing this decay have been determined. It is expected that alpha values of between about 0.2 and 0.8 should suffice. In preferred embodiments, the alpha fade value is configurable by a programmer or user of the graphics accelerator 106. For example, the alpha value may range from zero to one, where a value of zero completely fades the given half frame (i.e., it causes the given half frame to be transparent), and a value of one does not fade the given half frame at all. Preferred implementations divide this alpha value range into 256 different values for additional granularity.

As it is produced, the faded half frame is written to the back buffer 200A (step 306). Once the complete faded half frame is in the back buffer 200A, the process then continues to step 308 in which the next succeeding half-frame in the video signal also is stored in the back buffer 200A (the "unfaded half-frame"). Since the faded half-frame and unfaded half-frame are complimentary frames (i.e., the unfaded half-frame has odd lines only while the faded half-frame has even lines only, or the unfaded half-frame has even lines only while the faded half-frame has odd lines only), each of the lines of the display device 108 can be utilized upon a subsequent buffer swap. In some embodiments, the faded half frame and unfaded half frame are written to the back buffer 200A substantially simultaneously, while in other embodiments, they are serially written to the back buffer 200A.

The data in the back buffer 200A (i.e., the faded and unfaded half frames) then is moved to the front buffer 200B in step 310, thus causing the faded half-frame and unfaded half-frame to be displayed simultaneously on the display device 108. This data transfer may be executed by a conventional buffer swap. It then is determined at step 312 if the end of the video signal has been reached. If the end of the signal has been reached, then the process ends. If the video signal has additional half-frames, however, then the process loops back to step 304 in which the unfaded half-frame in the front buffer 200B is faded. As can be deduced, the process continues by fading the unfaded half-frame to produce a new faded half-frame, and then displaying that new faded half-frame with the next succeeding half-frame in the video signal.

In preferred embodiments, the process shown in FIG. 3 is implemented substantially entirely in hardware. For example, the resolver 206 may be configured (i.e., "hardwired") to execute the display process. In other embodiments, the process may be implemented in both hardware and software.

Figure 4:
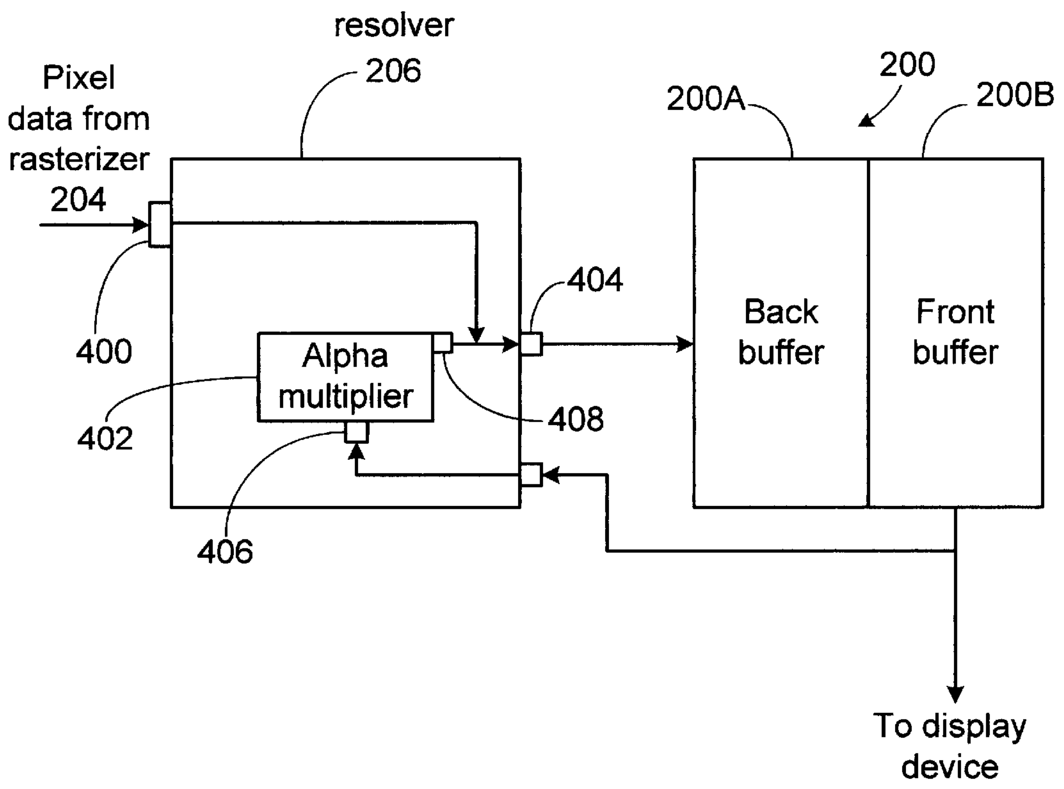
FIG. 4 schematically shows the a preferred embodiment of the invention in which a resolver shown in FIG. 2 is configured to execute the process shown in FIG. 3.

FIG. 4 schematically shows the a preferred embodiment of the invention in which the resolver 206 is configured to execute the process shown in FIG. 3. Specifically, the resolver 206 includes an input 400 for receiving data from the rasterizer 204, and alpha multiplier 402 for executing the fade operations of step 304 (above), and an output 404 to the back buffer 200A of the frame buffer 200. The alpha multiplier 402 has an input 406 coupled with the front buffer 200B of the frame buffer 200 for receiving frame data from the front buffer 200B, and an output 408 coupled to the resolver output 404. The resolver output 404 correspondingly is coupled with the back buffer 200A to forward the faded half frame to the back buffer 200A.

Accordingly, in conformance with FIG. 3, new frame data is written directly to the back buffer 200A, while frame data in the front buffer 200B is faded by the alpha multiplier 402 prior to being written to the back buffer 200A. As noted above, the graphics accelerator 106 preferably includes a plurality of parallel geometry accelerators 202, rasterizers 204, and resolvers 206 that process data on a pixel by pixel basis. Details of this parallel configuration are disclosed in the above noted patent applications.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of processing a television signal for simulating a television image on a computer monitor, the television signal being a stream of alternating first and second data blocks, the method comprising:

receiving a first data block and a second data block of the television signal, the first data block immediately preceding the second data block in the television signal;

fading the first data block to produce a faded first data block;

combining the first faded data block with the second data block to produce a frame; and forwarding the frame to the computer monitor.

2. The method as defined by claim 1 wherein the first data block comprises even field line data and the second data block comprises odd field line data.

3. The method as defined by claim 1 wherein the first data block is faded by receiving a fade value, and applying the fade value to the first data block to produce the faded first data block.

4. The method as defined by claim 1 wherein the first data block is received in a back buffer from a front buffer, the back buffer and front buffer being within a double buffered frame buffer.

5. The method as defined by claim 4 wherein the frame is within the back buffer, the method further comprising:

executing a buffer swap after the frame is within the back buffer.

6. An apparatus for processing a television signal for simulating a television image on a computer monitor, the television signal being a stream of alternating first and second data blocks, the method comprising:

an input that receives a first data block and a second data block of the television signal, the first data block immediately preceding the second data block in the television signal;

a fading device operatively coupled with the input, the fading device fading the first data block to produce a faded first data block;

a block combiner operatively coupled with the fading device, the block combiner combining the first faded data block with the second data block to produce a frame; and an output operatively coupled with the block combiner, the output forwarding the frame to the computer monitor.

7. The apparatus as defined by claim 6 wherein the first data block comprises even field line data and the second data block comprises odd field line data.

8. The apparatus as defined by claim 6 wherein the fading device includes an input for receiving a fade value, and a fade module that applies the fade value to the first data block to produce the faded first data block.

9. The apparatus as defined by claim 6 wherein the input comprises a back buffer that receives the first data block from a front buffer, the back buffer and front buffer being within a double buffered frame buffer.

10. The apparatus as defined by claim 9 wherein the frame is within the back buffer, the apparatus further comprising:

means for executing a buffer swap after the frame is within the back buffer.

11. A computer program product for use on a computer system for processing a television signal for simulating a television image on a computer monitor, the television signal being a stream of alternating first and second data blocks, the computer program product comprising a computer usable medium having computer readable program code thereon, the computer readable program code comprising:

program code for receiving a first data block and a second data block of the television signal, the first data block immediately preceding the second data block in the television signal;

program code for fading the first data block to produce a faded first data block;

program code for combining the first faded data block with the second data block to produce a frame; and program code for forwarding the frame to the computer monitor.

12. The computer program product as defined by claim 11 wherein the first data block comprises even field line data and the second data block comprises odd field line data.

13. The computer program product as defined by claim 11 wherein the program code for fading comprises program code for receiving a fade value, and program code for applying the fade value to the first data block to produce the faded first data block.

14. The computer program product as defined by claim 11 wherein the first data block is received in a back buffer from a front buffer, the back buffer and front buffer being within a double buffered frame buffer.

15. The computer program product as defined by claim 14 wherein the frame is within the back buffer, the computer program product further comprising:

program code for executing a buffer swap after the frame is within the back buffer.

16. A method of displaying a television signal on a computer monitor, the computer monitor having a first set of lines and a second set of lines, the television signal being a stream of first field data blocks and second field data blocks, the method comprising:

A. receiving a selected first field data block of the television signal, the first field data block having an immediately preceding second field data block;

B. fading the immediately preceding second field data block to produce a faded second block;

C. displaying the faded second block on the second set of lines on the monitor; and D. displaying the selected first field data block on the first set of lines on the monitor.

17. The method as defined by claim 16 wherein the first field data block has an immediately following second field data block, the method further comprising:

E. fading the first field data block to produce a faded first data block;

F. after completing step D, displaying the faded first data block on the first set of lines on the monitor; and G. after completing step C, displaying the immediately following second field data block on the second set of lines on the monitor.

18. The method as defined by claim 17 wherein steps F and G are performed at substantially the same time.

19. The method as defined by claim 16 wherein the first field data blocks are even field line data and the second field data blocks are odd field line data.

20. The method as defined by claim 19 wherein the first set of lines are even lines and the second set of lines are odd lines.

21. The method as defined by claim 16 wherein the first field data blocks are odd field line data and the second field data blocks are even field line data.

22. The method as defined by claim 21 wherein the first set of lines are odd lines and the second set of lines are even lines.

23. The method as defined by claim 16 wherein the television signal is in the NTSC format.

24. The method as defined by claim 16 wherein the television signal is in the PAL format.

25. The method as defined by claim 16 wherein step B comprises the step of:

B1. retrieving the immediately preceding second field data block from a front buffer in a double buffer frame buffer;

B2. applying alpha blending to the immediately preceding second field data block to produce the faded second block; and B3. copying the faded second block into a back buffer of the frame buffer.

26. An apparatus for displaying a television signal on a computer monitor, the computer monitor having a first set of lines and a second set of lines, the television signal being a stream of first field data blocks and second field data blocks, the apparatus comprising:

a receiver for receiving a selected first field data block in the television signal, the first field data block having an immediately preceding second field data block;

a fading device that fades the immediately preceding second field data block to produce a faded second block;

an output that forwards both the faded second block and selected first field data block to the monitor, the faded second block being displayed on the second set of lines on the monitor, the selected first field data block being displayed on the first set of lines on the monitor.

27. The apparatus as defined by claim 26 wherein the first field data blocks are even field line data and the second field data blocks are odd field line data.

28. The apparatus as defined by claim 27 wherein the first set of lines are even lines and the second set of lines are odd lines.

29. The apparatus as defined by claim 26 wherein the first field data blocks are odd field line data and the second field data blocks are even field line data.

30. The apparatus as defined by claim 29 wherein the first set of lines are odd lines and the second set of lines are even lines.

31. The apparatus as defined by claim 26 wherein the television signal is in the NTSC format.

32. The apparatus as defined by claim 26 wherein the television signal is in the PAL format.

33. The apparatus as defined by claim 26 wherein the fading device comprises:

means for retrieving the immediately preceding second field data block from a front buffer in a double buffer frame buffer;

means for applying alpha blending to the immediately preceding second field data block to produce the faded second block; and means for copying the faded second block into a back buffer of the frame buffer.

34. A computer program product for use on a computer system for displaying a television signal on a computer monitor, the computer monitor having a first set of lines and a second set of lines, the television signal being a stream of first field data blocks and second field data blocks, the computer program product comprising a computer usable medium having computer readable program code thereon, the computer readable program code comprising:

program code for receiving a selected first field data block in the television signal, the first field data block having an immediately preceding second field data block;

program code for fading the immediately preceding second field data block to produce a faded second block;

program code for displaying the faded second block on the second set of lines on the monitor; and program code for displaying the selected first field data block on the first set of lines on the monitor.

35. The computer program product as defined by claim 34 wherein the television signal includes a final field data block that does not have an immediately following data block, the computer program product further comprising:

program code for determining if the selected data block is the final field data block; and program code for executing the program code for receiving, fading, displaying the faded second block, and displaying the selected first field data block for each successive data block in the television signal that is determined not to be the final field data block.

36. The computer program product as defined by claim 34 wherein the first field data blocks are even field line data and the second field data blocks are odd field line data.

37. The computer program product as defined by claim 36 wherein the first set of lines are even lines and the second set of lines are odd lines.

38. The computer program product as defined by claim 34 wherein the first field data blocks are odd field line data and the second field data blocks are even field line data.

39. The computer program product as defined by claim 38 wherein the first set of lines are odd lines and the second set of lines are even lines.

40. The computer program product as defined by claim 34 wherein the television signal is in the NTSC format.

41. The computer program product as defined by claim 34 wherein the television signal is in the PAL format.

42. The computer program product as defined by claim 34 wherein the program code for fading comprises:

program code for retrieving the immediately preceding second field data block from a front buffer in a double buffer frame buffer;

program code for applying alpha blending to the immediately preceding second field data block to produce the faded second block; and program code for copying the faded second block into a back buffer of the frame buffer.

* * * * *